United States Patent
Kim et al.

(10) Patent No.: US 7,443,512 B2
(45) Date of Patent: Oct. 28, 2008

(54) APPARATUS AND METHOD FOR MEASUREMENT OF FILM THICKNESS USING IMPROVED FAST FOURIER TRANSFORMATION

(75) Inventors: Sang-Youl Kim, Seongnam (KR); Sang-Jun Kim, Suwon (KR)

(73) Assignee: Ellipso Technology Co., Ltd. (KR)

( * ) Notice: Subject to any disclaimer, the term of this patent is extended or adjusted under 35 U.S.C. 154(b) by 0 days.

(21) Appl. No.: 10/541,876

(22) PCT Filed: Jun. 18, 2003

(86) PCT No.: PCT/KR03/01203

§ 371 (c)(1),
(2), (4) Date: Jul. 8, 2005

(87) PCT Pub. No.: WO2004/063661

PCT Pub. Date: Jul. 29, 2004

(65) Prior Publication Data

US 2006/0082786 A1    Apr. 20, 2006

(30) Foreign Application Priority Data

Jan. 11, 2003    (KR) .................. 10-2003-0001854

(51) Int. Cl.
*G01B 11/02*    (2006.01)
*G01B 9/02*    (2006.01)
*G01J 3/45*    (2006.01)

(52) U.S. Cl. ...................... 356/504; 356/451

(58) Field of Classification Search ................. 356/503, 356/504, 517, 451; 250/559.19, 559.27, 250/559.28
See application file for complete search history.

(56) References Cited

U.S. PATENT DOCUMENTS

| | | | | |
|---|---|---|---|---|
| 5,440,141 A * | 8/1995 | Horie | .............. | 250/559.27 |
| 5,866,917 A * | 2/1999 | Suzuki et al. | .............. | 250/559.27 |
| 6,239,878 B1 * | 5/2001 | Goldberg | .............. | 356/520 |
| 6,445,457 B1 * | 9/2002 | Early | .............. | 356/630 |
| 7,145,662 B2 * | 12/2006 | Jeong et al. | .............. | 356/504 |
| 2004/0246493 A1 * | 12/2004 | Kim et al. | .............. | 356/504 |

* cited by examiner

*Primary Examiner*—Michael A Lyons
(74) *Attorney, Agent, or Firm*—Galgano & Associates, PLLC

(57) ABSTRACT

The present invention relates to an apparatus and method for a measurement of a film thickness using an improved fast Fourier transformation. The apparatus includes a light source, a light receiving unit for converging a light from the light source, a detection unit for splitting a reflection light reflected by the surface of the sample and inputted into the optical fabric through the lens, and outputted to the other side of the optical fabric based on a light intensity of each wavelength and providing a certain amount of wavelength, a conversion unit for converting a wavelength based spectrum data detected by the detection unit into an analog signal and then converting into a digital signal through a converter, a computation unit for computing the number of vibrations based on a high speed Fourier transformation, and an analyzing unit for measuring a film thickness.

4 Claims, 15 Drawing Sheets

(a)

(b)

(a)

(b)

(a)

(b)

(a)

(b)

(a)

(b)

(c)

APPARATUS AND METHOD FOR MEASUREMENT OF FILM THICKNESS USING IMPROVED FAST FOURIER TRANSFORMATION

RELATED APPLICATION

This application claims the benefit of Korean application No. 10-2003-0001854.

FIELD OF INVENTION

The present invention relates to an apparatus and method for measurement of film thickness using an improved fast Fourier transformation, and in particular, to an apparatus and method for measuring a film thickness using an improved fast Fourier transformation which affords enhanced accuracy when measuring film thickness based on a vibration period obtained by fast Fourier-transforming a reflection spectrum on an energy axis in which a weight of a refraction index is multiplied.

BACKGROUND OF THE INVENTION

Due to advances in industry and requirements of higher intergration, thin film devices are on the rise. As a technology advances, there is a greater need for more uniform thin films having a few or a few tens of nm thickness in highly integrated circuits, optical electron devices and display devices. A thin film device is recognized as a very important device in various applications such as in an insulation layer and an active layer of a semiconductor device, a transparent electrode of a LCD device, and a light emitting layer and a protection layer of an electroluminescence (EL) device.

Here, the thickness of a thin film is a very important control factor which affects fabrication yield and reliability. A need for a real time measurement is increased for a process control in fabrication of such semiconductors and optical devices.

In addition, various thicknesses of the thin film is needed from a few Å to a few hundreds of nm or from a few tens of μm to a few hundreds of μm.

A conventional method (Korean patent laid-open No. 4411) is directed to a mechanical method which is implemented using a probe for measuring a thickness of a thin film. In the above method, there are provided an evaporation source for evaporating a thin film material and a substrate provided in a vacuum chamber having a probe for generating a plasma of a material evaporated. The probe and the substrate are arranged at a certain interval in the vacuum chamber. A first parameter among a plurality of operation parameters which include a voltage applied between the probed and a reference electric potential level and a current flowing through the probe and the plasma is fixed as a fixed value during a certain time interval. A second parameter value among the probe operation variables which are changed in proportion to a deposition rate of the material evaporated on a substrate is measured for thereby measuring the thickness of the thin film.

However, the above mechanical method which uses a probe for measuring the thickness of a thin film may affect the thin film which will be measured, and in the above method, the accuracy of the measured value may be poor if the thin film has a soft surface.

In order to overcome the above problems, the present invention provides a method which is based on an optical process and does not affect the thin film when measuring its thickness.

As an optical method for determining a thickness of a thin film, there are a method implemented using an ellipsometer which is well adapted to an analysis of a thin film including a measurement of a thickness and thickness distribution of an oxide film in a semiconductor industry or by measuring a reflectance, a transmittance, etc. in such a manner that a correct information concerning a physical property and structure of a sample is obtained through a measurement and analysis of a polarized state and variation of light, and a method which is implemented using an interferometer. In the above methods, it is possible to easily measure a thickness of a thin film from a few Å to a few, μm without affecting the sample to be measured.

FIG. 1 is a view illustrating a thin film measurement apparatus using a conventional ellipsometer according to the prior art. The ellipsometer is composed of a polarizer module 101 and an analyzer 102. The light from a light source is polarized by the polarizer module 101 and is directed towards thin film substrate 103. The light reflected by the substrate 103 is collected by the analyzer module 102, and a polarized state of the reflection light is detected by the detector. The detector compares the polarized state of the incident light with a polarized state of the reflection light and obtains an optical coefficient (refraction index or attenuation coefficient) of the film's thickness. However, with the film thickness measuring apparatus of this type, it is impossible to measure the thin film thickness when there are vertical vibrations, inclination and shift in the substrate 103. In addition, in the fabrication line of the LCD apparatus which uses a large thin film glass substrate having a thickness of about 0.5-1.1 mm and a size of a few hundreds square of mm, there are a warping (partial inclination), Vibration, etc. in the substrate. In the case that the thickness of the thin film is below a few μm, when a thickness of a few tens of μm of the thick film is analyzed based on a quantitative light intensity measuring method such as a thin film analysis by an ellipsometer method or a reflection index measurement, the thickness is measured based on a vibration period which occurs in a reflection index or a transmissivity due to an interference effect by a thin film. In particular, in the case that the thickness is a few tens of μm or a few hundreds of μm, there are very difficult requirements in a wavelength resolution of a spectroscope, a ling source or a coherency of a thin film in order to implement a desired interference effect by a thick film. Therefore, it is impossible to determine the thickness of a thick film based on the conventional optical method. In the case that a wavelength resolution or coherency of a spectroscope is poor, a method in which a vibration period (number of vibrations) based on an interference is obtained, and a thickness of a thin film is determined, is effectively used. However, in the case of the thick film, the period has a large value, and the time needed for computing a thin film thickness is increased. In addition, it is needed to increase a vibration period of a spectrum in order to meet a customer's demand that the thickness of a thick film is easily and fast measured. If a wavelength resolution is low, it is impossible to fast check the period of the vibration.

In order to implement the period of the vibration of the spectrum fast, the fast Fourier transformation (FFT) is used. However, in the above FFT, the interval of the peaks is slightly decreased since a refraction index of a thin film is not adapted, and since there are different diffraction indexes based on the wavelength, the values of the thickness obtained based on the value of the refraction index which determines the position of the Fourier peak are changed for thereby decreasing the size of the peak and increasing the width.

Namely, since the periods of the vibrations are not constant, there is a problem in the accuracy of the film thickness.

SUMMARY OF THE INVENTION

Accordingly, it is an object of the present invention to overcome the above problems encountered in the conventional art.

It is another object of the present invention to provide a film thickness measuring apparatus and method having a high analyzing speed and high accuracy through a vibration period obtained based on a fast Fourier transformation with respect to a reflection spectrum in a new energy axis obtained by multiplying a refraction index weight with a light energy for reflecting a variation of a refraction index, namely, a refraction index dispersion based on a wavelength.

It is further another object of the present invention to provide a film thickness measuring apparatus using a fast Fourier transformation which is capable of preventing a peak width from being increased during a Fourier transformation even when a reflection film is formed on a substrate by a certain area ratio by a reflection light, and a multiple thin film is formed on a substrate and which is capable of implementing an accuracy during a determination of a peak position for thereby measuring a thickness of a thin film based on a high accuracy.

It is still further another object of the present invention to provide a method which is well adapted to a reflection ratio spectrum as well as other spectrums which have a certain vibration by an interference of a thick film like a transmission rate spectrum, for thereby implementing an accurate measurement of a film thickness.

To achieve the above objects, there is provided a film thickness measuring apparatus using a fast Fourier transformation which comprises a light receiving unit which includes a light source, an optical fiber which focuses a light from the light source, outputs the light in a direction, receives the light reflected by a surface of a sample material of a substrate having a thin film and outputs the light in the other direction, and a lens which adjusts the magnification of a light from the optical fiber and a light reflected by the surface of the sample material; a detection unit which includes a spectrograph which splits a reflection light which is reflected by the surface of the sample material and is inputted into the optical fiber through the lens and is outputted in the other direction, based on an optical intensity (spectrum) of each wavelength, and an optical measuring device array which provides a certain light intensity of each wavelength; a transformation unit which transforms a wavelength based spectrum detected by the detection unit into an analog signal and transforms the analog signal into a digital signal by the transformation unit; a computation unit which computes the number of vibrations based on a fast Fourier transformation in which the data transformed by the transformation unit adapts a refraction index dispersion; and an analyzing unit which measures and analyzes a film thickness based on the number of vibrations computed by the computation unit, and a result of the same is displayed.

In addition, the computation unit adapted to compute the number of vibrations based on a fast Fourier transformation adapting the refraction index dispersion is directed to measuring a film thickness based on the number of the vibrations obtained based on the fast Fourier transformation with respect to reflection spectrum on an energy axis in which the refraction index weight is multiplied.

In a method for measuring a thickness of a thin film based on an interference effect by a thin film, there is provided a method for measuring a film thickness using an improved fast Fourier transformation, comprising the steps of a step in which a light from a light source is focused on a substrate having a grown thin film, and the light is inputted onto an end of an optical fiber; a step in which the light from an end of the optical fiber is vertically inputted onto a surface of a sample material having a thin film; a step in which the light vertically inputted onto a surface of the sample material having a thin film is reflected and inputted into the optical fiber through a lens; a step in which a wavelength based spectrum data is transformed into an analog signal by a detection unit which splits the outputted light into a spectrum of each wavelength, and the analog signal is transformed into a digital signal; a step in which a film thickness is computed based on a vibration period obtained based on a fast Fourier transformation by adapting a refraction index dispersion through the transformed signal; and a step in which a thickness of a film is analyzed by the computed film thickness, and the analyzed result is displayed.

BRIEF DESCRIPTION OF THE DRAWINGS

The present invention will become better understood with reference to the accompanying drawings which are given only by way of illustration and thus are not limitative of the present invention, wherein;

FIGS. 4 through 7 are views illustrating a result of an experiment performed based on a film thickness measuring apparatus and method using a fast Fourier transformation using a dielectric thin film according to the present invention;

FIG. 5 is a graph illustrating a reflectivity spectrum based on a dielectric thin film having a thickness of 30 μm with respect to an energy axis;

FIGS. 8 and 9 are graphs illustrating a comparison obtained by adapting a film thickness measuring apparatus and method using a fast Fourier transformation to a HD-BVD which is an actual sample according to the present invention;

DETAILED DESCRIPTION OF THE INVENTION

The present invention will be described in detail with reference to the accompanying drawings.

Figure 1:
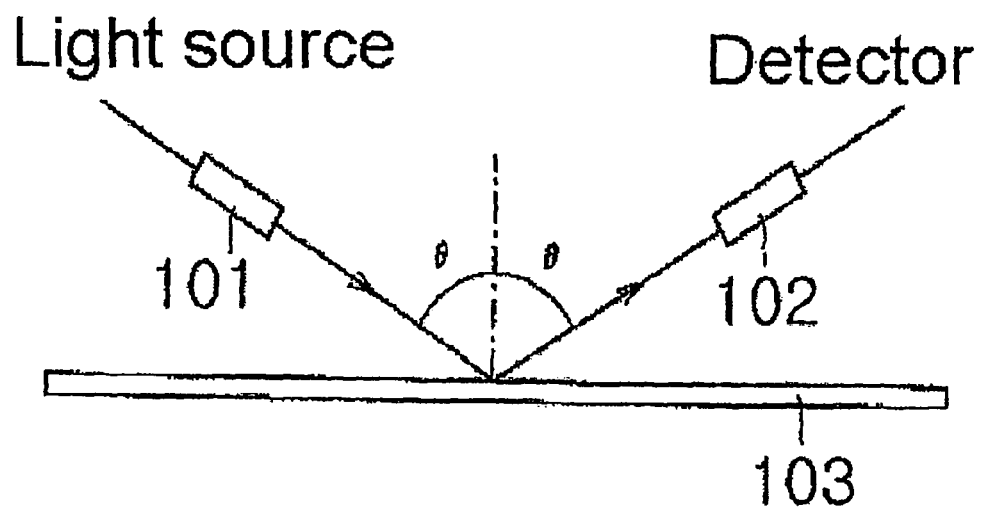
FIG. 1 is a view for describing a film thickness measuring method using a conventional ellipse measuring apparatus.
Figure 2:
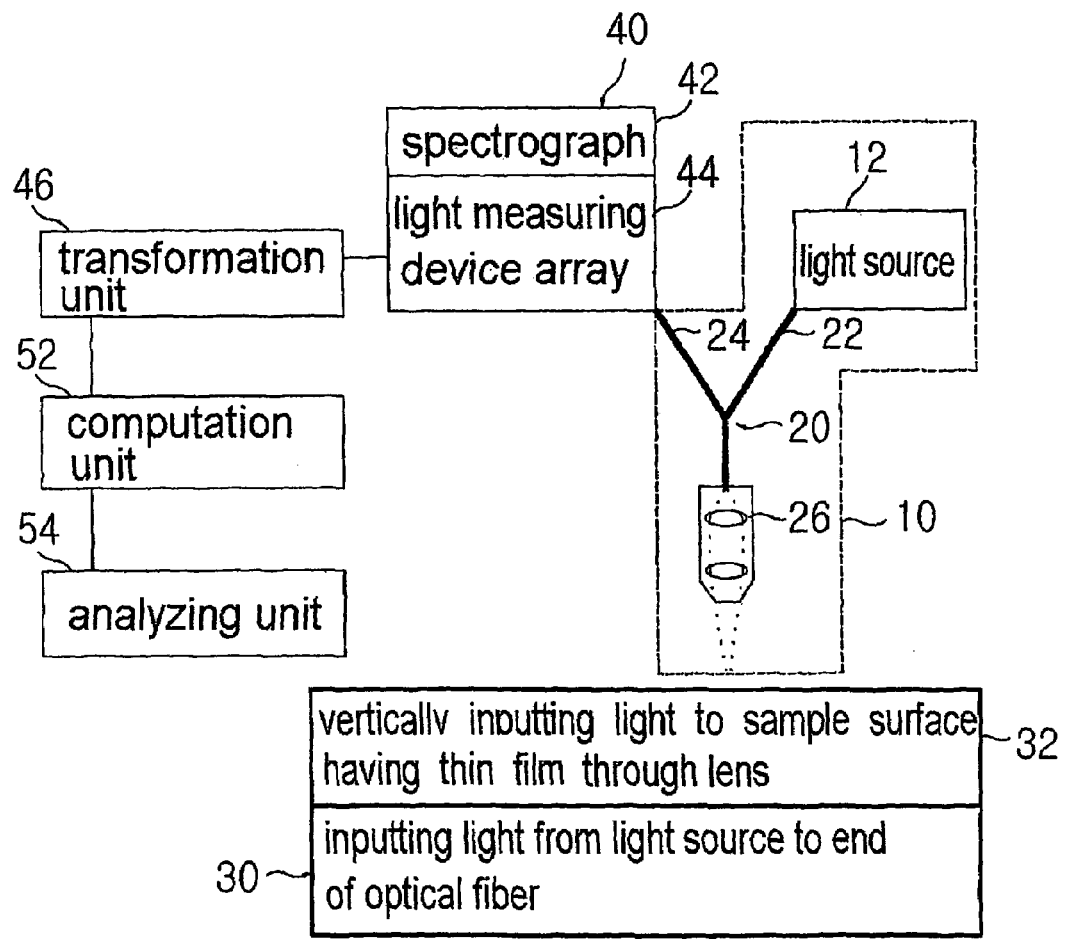
FIG. 2 is a view illustrating the construction of a film thickness measuring apparatus using a fast Fourier transformation according to the present invention.

FIG. 2 is a view illustrating the construction of a thin film measuring apparatus using a fast Fourier transformation according to the present invention. In the thin film measuring apparatus which is directed to measuring film thickness based on a reflectivity spectrum measuring method, a light is vertically directed onto a substrate 30. There are provided a light receiving unit 10 which receives a light reflected by the substrate, a detection unit 40 which splits a light reflected by the light receiving unit 10 and provides a polarized state of a split light and a wavelength based light intensity, a transformation unit 46 which transforms the wavelength based spectrum data detected by the detection unit 40 into an analog signal and transforms the analog signal into a digital signal using a transformer, a computation unit 52 which computes the number of vibrations based on a fast Fourier transformation in which data transformed by the transformation unit 46 reflects the refraction index dispersion, and an analyzing unit 54 which measures and analyzes the film thickness based on the number of vibrations obtained by the computation unit 52 and displays the measured and analyzed value.

The light receiving unit is composed of a light source 12, an optical fiber 20 and a lens 26. A light emitted from the light source 12 is focused at one end of the branched portion of the Y-shaped optical fiber 20. The light focused at the end of the optical fiber is transmitted through the lens 26 (which provides, 4-10 times magnification and is vertically inputted onto a surface of a thin film sample. The diameter of the beam on the surface of the sample is determined based on the diameter of the optical fiber and a range of a few in infrared microns based on a magnification of an objective lens. The reflected light from the surface of the sample is directed into an optical fiber through the objective lens and is transmitted to an end of the other portion of the Y-shape optical fiber 20. The outputted light is transmitted to the detection unit 40.

The detection unit 40 is composed of a spectrograph 42 and a light measuring device array 44. The spectrograph 42 splits the light reflected from the surface of the sample of the substrate 30 based on the wavelength, and the split light is inputted into the optical measuring device array 44, thereby measuring a light intensity at each wavelength.

The transformation unit 46 transforms the wavelength based spectrum data detected by the detection unit 40 into an analog signal and performs a computation using a data transformed into a digital signal through the fast A/D transformer for thereby measuring film thickness.

The computation unit 52 computes a thickness of the thin film based on the number of vibrations obtained by performing a fast Fourier transformation with respect to the reflection spectrum at an energy axis in which a refraction index weight is multiplier, so that the computation unit 52 is capable of reducing the time needed for analyzing the thickness of the thin film based on a fast Fourier transformation.

The film thickness is measured and analyzed based on the number of the vibrations computed by the computation unit 52, and the results of the measurement and analysis are used for analyzing a reason of a certain defect of the thin film based on the analyzing unit 54, so that it is possible to develop a certain database used for setting the conditions of the thin film.

Preferably, the measurement of the film thickness performed by the computation unit 52 and the analyzing unit 54 is implemented using a computer. The computer receives a spectrum data with respect to each wavelength from the spectrograph 42 and the light device array 44 and computes the thickness of the thin film and stores a data related to the thickness of the thin film.

Here, the shape of the optical fiber is not limited to the Y-shaped. In addition, the lens used herein is not limited to the objective lens.

Figure 3:
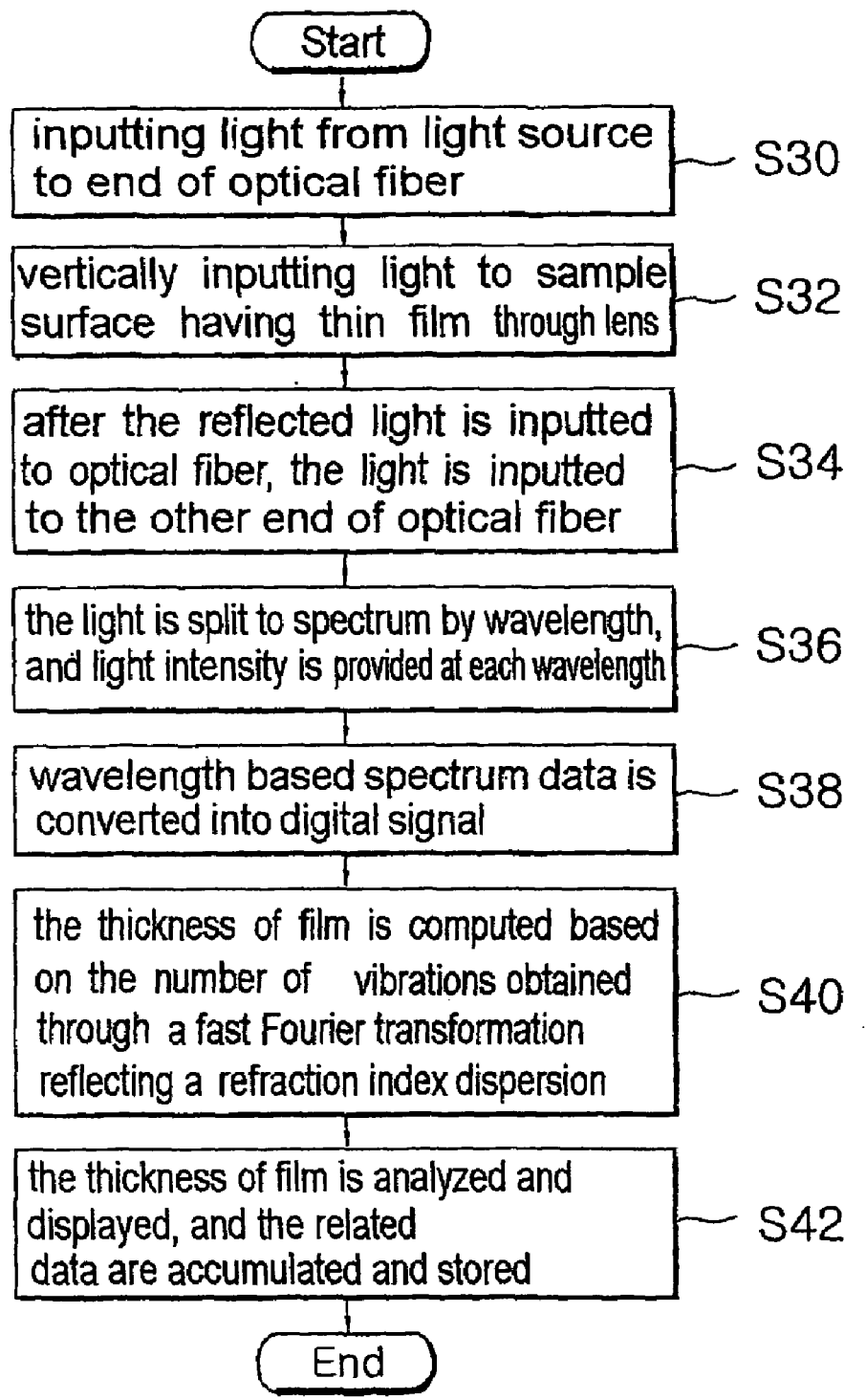
FIG. 3 is a flow chart of a film thickness measuring method using a fast Fourier transformation according to the present invention.

FIG. 3 is a flow chart for describing a film thickness measuring method using a fast Fourier transformation according to the present invention. The film thickness measuring apparatus according to the present invention includes a light receiving unit which is formed of a light source, an optical fiber and a lens, a detection unit which comprises a spectrograph and an optical measuring device, a transformation unit, a computation unit and an analyzing unit.

The film thickness measuring method using a fast Fourier transformation according to the present invention includes a step S30 in which a light emitted from a light source is focused onto a substrate having a thin film and is inputted at an end of a portion of the optical fiber, a step S32 in which the light from an end of the portion of the optical fiber is vertically directed onto the surface of the sample through a lens, a step S34 in which the light vertically directed onto the surface of the sample having a thin film is reflected, and inputted into an optical fiber through the lens and is outputted to an end of the other portion of the optical fiber, a step S36 in which the emitted light is split into a spectrum of each wavelength for thereby obtaining a certain light intensity at each wavelength, a step S38 in which an information concerning the intensity of the light is received, and the wavelength based spectrum data is transformed into an analog signal and is transformed into a digital signal through the transformer, a step S40 in which the number of vibrations is obtained based on the fast Fourier transformation in which the dispersion of the refraction index is reflected based on the transformed data, and a film thickness is computed based on the number of vibrations, and a step S42 in which the thickness of the film is analyzed based on the computed film thickness and is displayed, and the related data are accumulated.

When obtaining the period of vibrations of the reflectivity spectrum based on an interference according to the present invention, the fast Fourier transformation which is improved based on a variation of a refraction index based on a wavelength and a fast Fourier transformation will be described.

Here, the film thickness is measured based on the refraction index dispersion through the interference effect by the dielectric thin film. The objects the refraction index dispersion and the fast Fourier transformation are adapted will be described. First, the refraction index dispersion is used for the reason that since there is a wavelength dependency of the refraction index of a certain material belonged to an actual thin film, namely, there is a dispersion of the thin film refraction index, the difference between the energies of two optical waves of a vibration period by an interference is not uniform. Therefore, in the peak of the number of the vibrations obtained when performing the fast Fourier transformation at an energy axis with respect to the reflection spectrum, the width is increased based on the degree of the dispersion of the refraction index, and the position of the peak is inaccurate. Therefore, the error for measuring the film thickness is increased. Therefore, the refraction index dispersion must be adapted for measuring the film thickness at a high accuracy.

The interference effects by the dielectric thin film will be described in detail. In the case of a thin film formed of a dielectric material and having a uniform thickness, the intensity of the reflection light between the air and the dielectric material is within a few % of the intensity of the incident light. Therefore, the interference by the reflection light may be adapted based on only the reflection light on the surface and a first reflection light which is reflected by the thin film by one time. In the case of the vertical incident light, the optical path difference (OPD) between the reflection wave on the surface of the dielectric thin film and the reflection wave which is reflected by the dielectric thin film by one time may be obtained based on the following Equation 1.

$$OPD = 2n_f d \quad \text{[Equation 1]}$$

Here, $n_f$ represents a refraction of a thin film, and d represents a thickness of a thin film.

According to the Equation 1 based on the phase variation due to a reflection, the value of $n_f d$ may cause a constructive or destructive interference based on the odd number multiple or even number multiple of ¼ of the wavelength of light.

Assuming that the wavelength of light is λ, the condition that the constructive or destructive interference may occur due to a relatively thick film may be implemented based on the following Equation 2.

$$n_f d = \frac{\lambda(\lambda + \Delta\lambda)}{2\Delta\lambda} \approx \frac{\lambda^2}{2\Delta\lambda} = \frac{619.9}{\Delta E} \quad \text{[Equation 2]}$$

Here, Δλ and ΔE represent the values measured on the axis of the wavelength (nm) or the energy (eV) axis with respect to the difference Δλ between two optical waves which may cause a certain vibration period by an interference, namely, the constructive interference (or destructive interference) or the difference ΔE of the energy. The units of the thickness are nm like the unit of wavelength.

In the case of the thick film, Δλ and ΔE are in inverse proportion to the thickness of the thin film, and the error of the proximate equation of Equation 2 is decreased in proportion to the size of Δλ and ΔE. ΔE is an inverse number of the value obtained on the energy axis with respect to the vibration period of the reflection spectrum, namely, the number of the vibrations of the reflection spectrum obtained on the energy axis. In the case that $n_f$ which is a refraction index of the thin film is constant, ΔE is constant. The above values provide a theoretical basis for adapting the fast Fourier transformation.

Assuming that the number of the vibrations of the reflection spectrum on the energy axis is $f_E$, the Equation 2 may be expressed in the following Equation 3.

$$n_f d = 619.9 \times f_E \quad \text{[Equation 3]}$$

However, since there is a dispersion of $n_f$ in the material of the thin film, it is needed to measure the film thickness based on the refraction index dispersion.

In the method for measuring a film thickness based on the number of vibrations obtained through the fast Fourier transformation based on the refraction index dispersion, the number of the vibrations is obtained based on the fast Fourier transformation using a reflection spectrum on the energy axis on which the refraction index weight is multiplied. The above operation may be expressed in the following Equation 4.

$$d = \frac{619.9}{\Delta(n_f E)} = 619.9 \times f_{nE} \quad \text{[Equation 4]}$$

Here, $f_{nE}$ represents the number of the vibrations obtained based on the Fourier transformation with respect to the reflection spectrum on the energy axis on which the refraction index weight is multiplied.

In the present invention, the film thickness is measured based on the number of the vibrations obtained based on the fast Fourier transformation with respect to the reflection spectrum on the energy axis on which the refraction index weight is multiplied for adapting the reflectivity dispersion.

The fast Fourier transformation is capable of largely increasing the speed of the Fourier transformation. Here, the Fourier transformation and the objects of the fast Fourier transformation will be described.

In the Fourier transformation which is implemented assuming that all waveforms may be expressed in the sum of simple sine waves, the signal process is implemented in a mathematical space known as a frequency space and a time space. Since a common signal has various complicated frequency components, it is possible to express the same in a sum of sine waves having different frequencies. It is needed to analyze a combined signal of different frequencies that are not easily analyzed in the case of one waveform by each frequency. A result of the analysis is recombined, so that it is possible to easily process the combined signal based on the process that an analysis result of an original signal is obtained. Expressing the common signal as a relationship between the time space and the frequency space which are actual spaces, the Fourier transformation Equations may be expressed in the following Equation 5.

$$x(t) = \int_{-\infty}^{+\infty} X(f) e^{-j2\pi ft} df$$

$$X(f) = \int_{-\infty}^{+\infty} x(t) e^{-j2\pi ft} dt \quad \text{[Equation 5]}$$

The above transformations are called as the Fourier transformation and the Fourier inverse transformation, respectively. The above Equations may not be directly used in the measurement and analysis due to the following reasons. First, the variation in the time space of the signal inputted into the computer is discontinuous. Second, since the Fourier integration of the Equation 5 is performed in an infinite, the actual signals inputted are provided in a limited range. The Fourier transformation adapted to a discrete signal is the discrete Fourier transformation (DFT). The discrete Fourier transformation will be described. Assuming that the waveform is inputted at a time interval of T on the time axis (or energy axis), the waveform arrays may be expressed like x(0), x(1), x(2), ..., x[(N−1)T]. A this time, the discrete Fourier array of x(nT), (n=0, 1, 2, ... N−1) has an array of the complex number like X(k)=X(0), X(1), X(2), ..., X(N−1) based on the frequency (thickness of the thin film). In this case, the discrete Fourier transformation may be expressed in the following Equation 6.

$$X(k) = \sum_{n=0}^{N-1} x(nT) e^{-j\omega nT} = \sum_{n=0}^{N-1} x(nT) e^{-j2\pi kn/N}, \; (\omega = 2\pi/NT) \quad \text{[Equation 6]}$$

In the discrete Fourier transformation, when the k-th element is compared with the (k+N)th element, there is a period of N which has the same value. The above result is an important factor that the discrete Fourier transformation has a close relationship with the fast Fourier transformation. It is possible to implement a computation of a multiplication of the N×N times and a computation of a sum of the N(N−1) times based on the discrete Fourier transformation which uses a N number of the input values based on the Equation 6. The above number is increased in proportion to the square of the value of N as the value of N is increased. Therefore, in the case that there are large values like N=1024 or N=2048 in the photo diode array (PDA), a relatively extended computation time is needed.

As an algorithm which is used for enhancing a computation speed of the Fourier transformation, the fast Fourier transformation decreases the computation speed from the number of $N^2$ to $N/2 \log_2 N$ compared to the discrete Fourier transformation for thereby implementing a fast analyzing speed, so that it is possible to effectively satisfy the customer's demand of a real time measurement and analysis.

The film thickness measuring apparatus and method using a fast Fourier transformation according to the present invention will be described in more detail using the interference effect of the dielectric thin film.

FIGS. 4 through 7 are views illustrating a result of an experiment implemented based on a film thickness measuring apparatus and method using a fast Fourier transformation using a dielectric thin film according to the present invention. As shown in FIG. 2, a film thickness measuring apparatus includes a substrate having a light source, an optical fiber, a lens and a thin film, an optical measurement device array, a transformation unit, a computation unit and an analyzing unit.

Figure 4A:
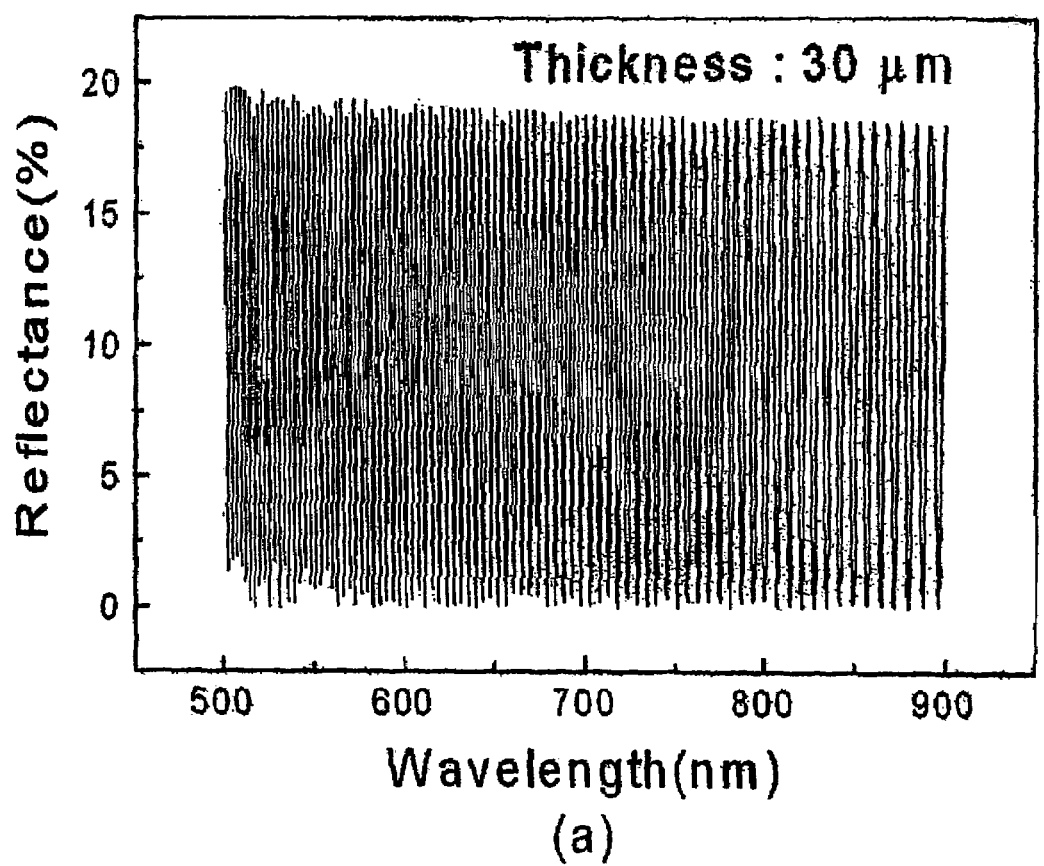
FIG. 4A is a graph of reflectivity spectrum based on a dielectric thin film having a thickness of 30 μm.
Figure 4B:
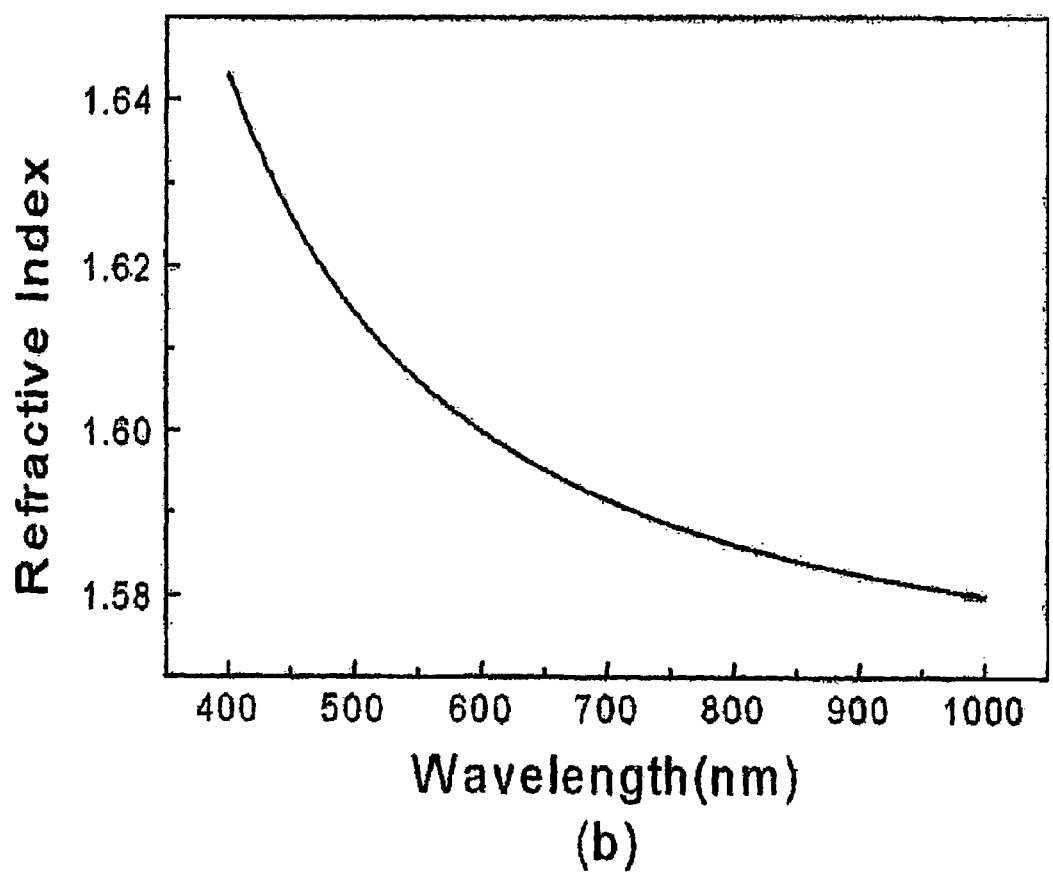
FIG. 4B is a graph of a refraction index dispersion curve of a dielectric thin film having a thickness of 30 μm.
Figure 5:
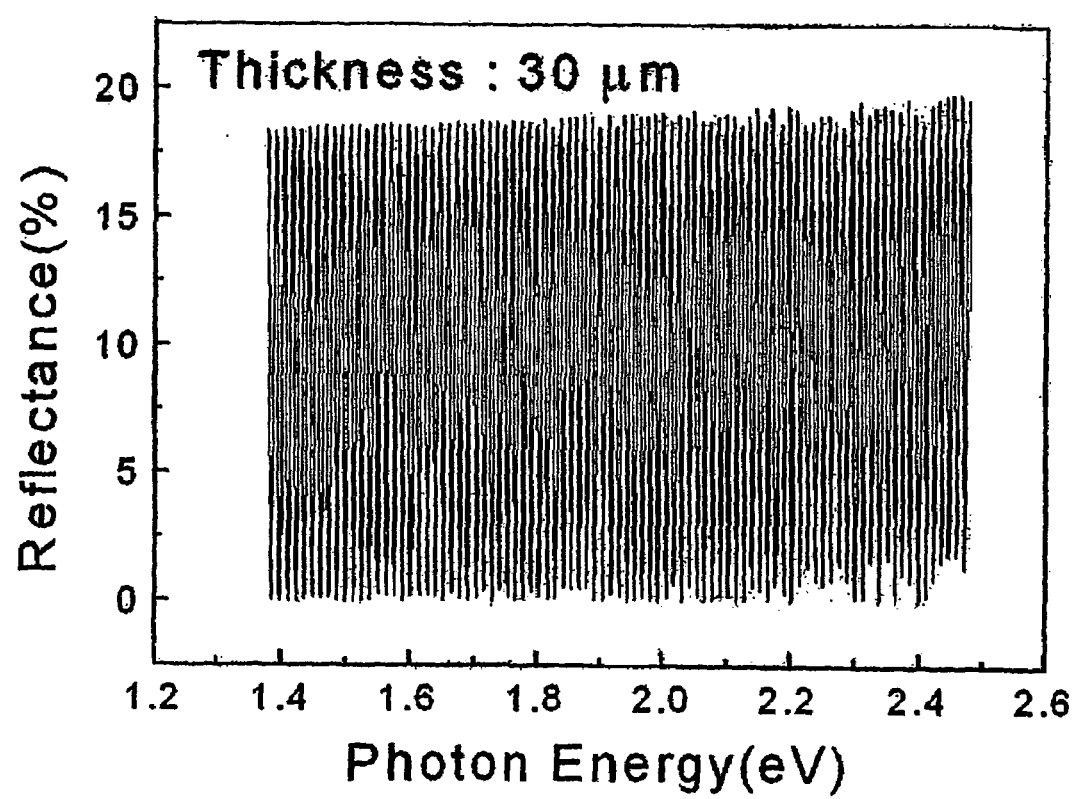

FIG. 4A is a graph of a reflectivity spectrum based on a dielectric thin film having a thickness of 30 μm, FIG. 4B is a graph of a refraction index dispersion curve of a dielectric thin film having a thickness of 30 μm, and FIG. 5 is a graph illustrating a reflectivity spectrum based on a dielectric thin film having a thickness of 30 μm with respect to an energy axis.

As shown in FIGS. 4A and 4B, it is possible to check a state that a peak width is decreased and a size of a peak is increased based on a reflectivity spectrum analysis by a dielectric thin film having a thickness of 30 μm in such a manner that a refraction index is adapted during a fast Fourier transformation. A dielectric thin film is set in such a manner that the dielectric thin film exists in the air without a certain air layer used for supporting the same. FIG. 4A is a view illustrating a reflectivity spectrum obtained based on a simulation, and FIG. 4B is a refraction index dispersion curve of a thin film used in a simulation.

A vibration period of a reflectivity spectrum which vibrates due to an interference of light by a thin film is in proportion to a square of a wavelength as shown in Equation 2. The vibration period of a reflectivity spectrum may be constant as shown in FIG. 5 with respect to an energy axis of a light. Since an effect is not corrected by refraction index dispersion, the vibration period is gradually decreased in the direction of an energy region. Carefully checking a vibration period, namely, an interval between the peaks, in the vibrating reflectivity spectrum, it is possible to clearly check a difference when the dispersion of the refraction index is adapted and the same is not adapted.

Figure 6A:
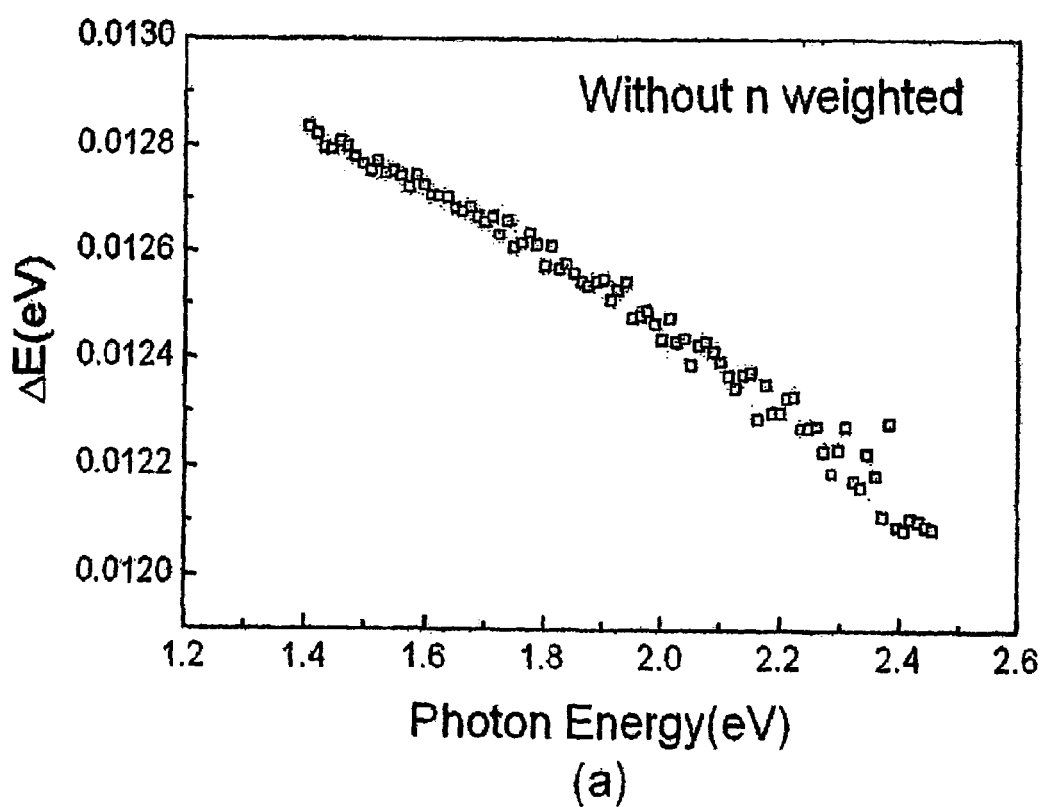
FIGS. 6A and 6B are comparison graphs illustrating a distance between peaks of a reflectivity spectrum based on a refraction index dispersion of a dielectric thin film with respect to an energy.
Figure 6B:
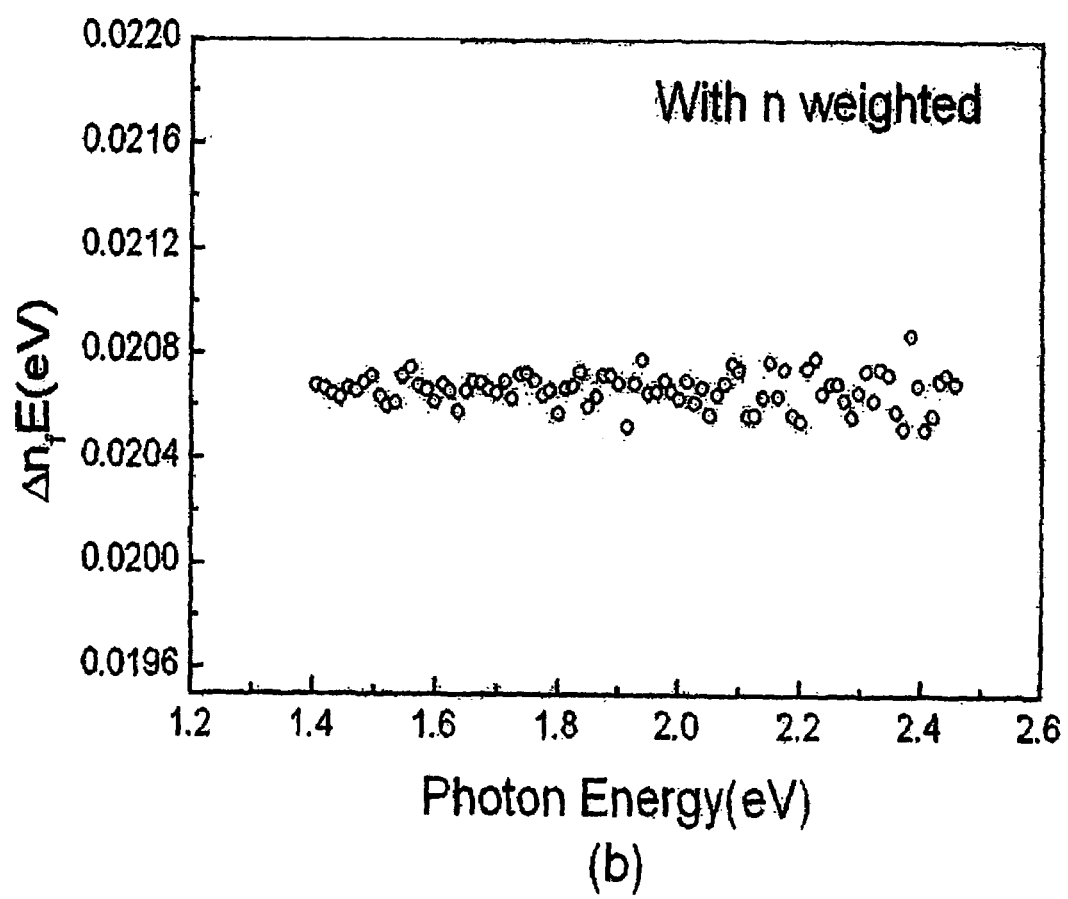

The states that the refraction index is adapted and is not adapted will be described with reference to FIGS. 6A and 6B. FIG. 6A is a graph of an interval between peaks observed in a reflectivity spectrum with respect to an energy in the case that a refraction index dispersion of a dielectric film is not adapted, and FIG. 6B is a graph illustrating an interval between peaks of a reflectivity spectrum with respect to an energy in the case that a refraction index dispersion of a dielectric thin film is adapted. Comparing the states of FIGS. 6A and 6B, it is possible to clearly know the effects.

As shown in FIG. 6A, an interval between peaks is obtained without considering a refraction index dispersion of a dielectric thin film. As the energy of a light is increased, the interval between peaks is gradually decreased in the direction of a short wavelength region. As shown in FIG. 6B, an interval between peaks is obtained by considering a dispersion of a refraction index by multiplying a refraction index weight with respect to energy of a light based on Equation 4. The interval is constantly maintained irrespective of an energy size of light.

Figure 7A:
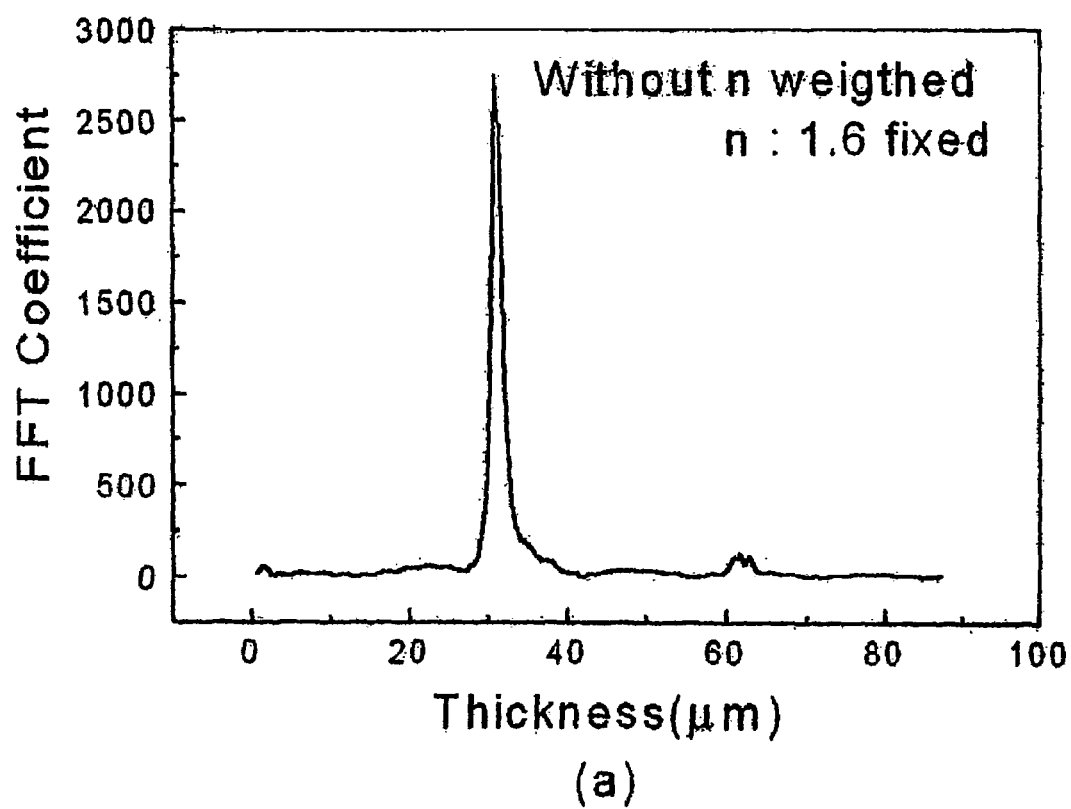
FIGS. 7A and 7B are comparison graphs illustrating a fast Fourier transformation of a reflectivity spectrum based on a refraction index dispersion of a dielectric thin film.

The effects that the refraction index dispersion is adapted are more clearly obtained based on the Fourier transformation. FIG. 7A is a graph of a fast Fourier transformation of a reflectivity spectrum in the case that a refraction index dispersion of a dielectric thin film is not adapted, and FIG. 7B is a graph of a fast Fourier transformation of a reflectivity spectrum in the case that a refraction index dispersion of a dielectric thin film is adapted.

Figure 7B:
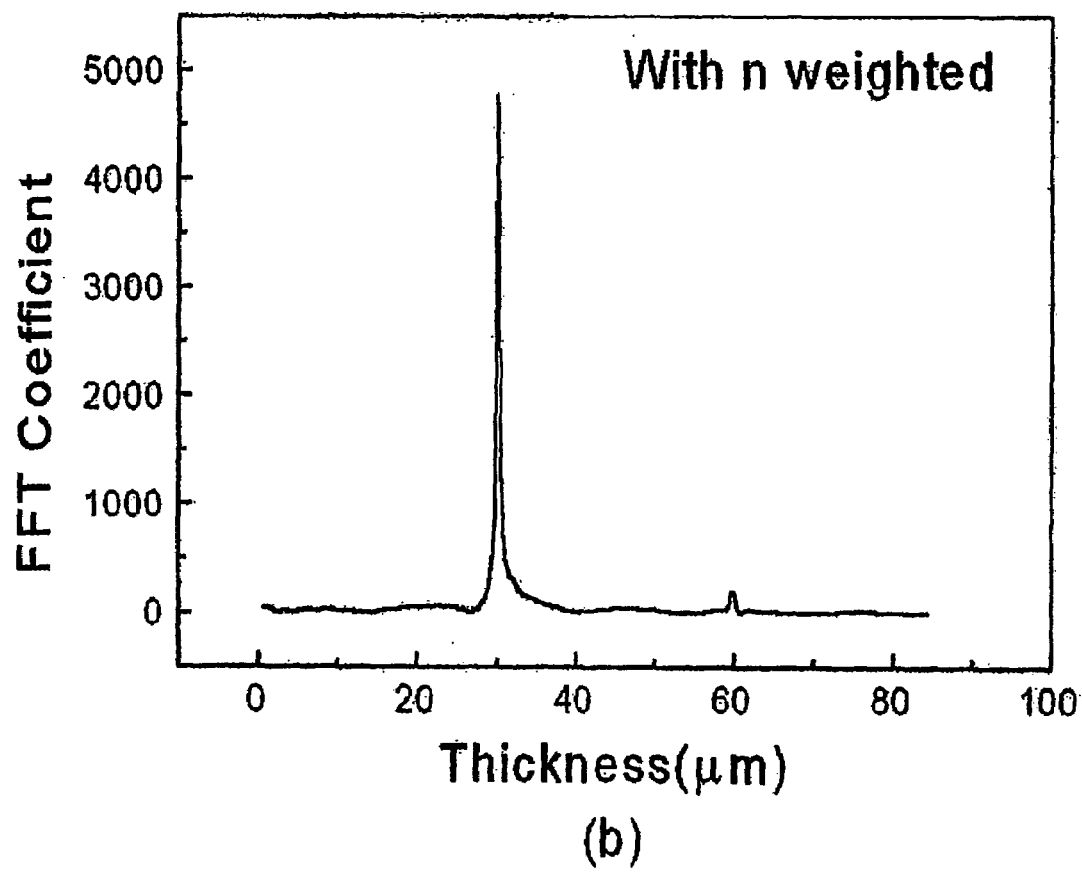

As shown in FIGS. 7A and 7B, in the case that the refraction index dispersion is adapted, the width of the peaks is significantly decreased from 1.61 μm to 0.44 μm as shown in the fast Fourier transformation, and the size of the peaks is increased by 1.7 times. The size increase and width decrease of the peaks are natural because the vibration interval of the reflectivity spectrum is uniform in the case that the refraction index dispersion is adapted. Therefore, there is shown a clear effect of the Fourier transformation based on the refraction index dispersion.

Another large effect obtained when the refraction index dispersion is adapted is obtained in the value of the thickness obtained after the Fourier transformation is performed.

In addition, further another large effect which is obtained in consideration with the refraction index dispersion is a thickness value obtained after the Fourier transformation is performed. FIG. 7A is a view which is obtained by computing a horizontal axis with a thickness after the Fourier transformation is performed, fixing the refraction index to n=1.6. As shown in FIG. 4B, since the dielectric thin film has different refraction index based on the wavelength, the thickness value obtained based on the refraction index value which divides the Fourier peak position is different.

Therefore, the thickness value computed based on the peak of FIG. 7A is 30 μm and have a difference of 0.71 μm compared to the actual thickness since the valid refraction index of the reflectivity spectrum over the region of 500-900 nm in which the refraction index is n=1.6 is not properly adapted. Namely, the above result may be called as an error which occurs because the refraction index dispersion is not basically adapted.

In FIG. 7B which shows the fast Fourier transformation graph obtained in consideration with the refraction index dispersion, since the refraction index dispersion is accurately adapted, an accurate film thickness value of 30 μm is obtained, so that it is possible to implement a fast analyzing speed and a film thickness measurement of a high accuracy.

In another embodiment of the present invention, the film thickness measuring apparatus and method using a fast Fourier transformation will be descried based on the reflection spectrum of the HD-DVD which is an actual sample material. Here, an actual sample material is used. The film thickness measuring apparatus will be specifically used.

The film thickness measuring apparatus according to the present invention includes a halogen light source, a glass optical fiber, an objective lens, a spectrograph and optical measuring device array, a fast A/D transformer, and a computer. The wavelength band is 500-1000 nm, the wavelength resolution is 0.4 nm, and the measuring speed is 0.5 seconds per spectrum. The measuring and analyzing speed including the fast Fourier transformation is about 2 seconds per one time.

The sample material used in the measurement as a HD-DVD optical disk which has an interest as an advanced optical recording medium includes a cover layer (CL) having a thickness of 80 μm and a spacer layer (SL) having a thickness of about 10 μm.

Figure 8A:
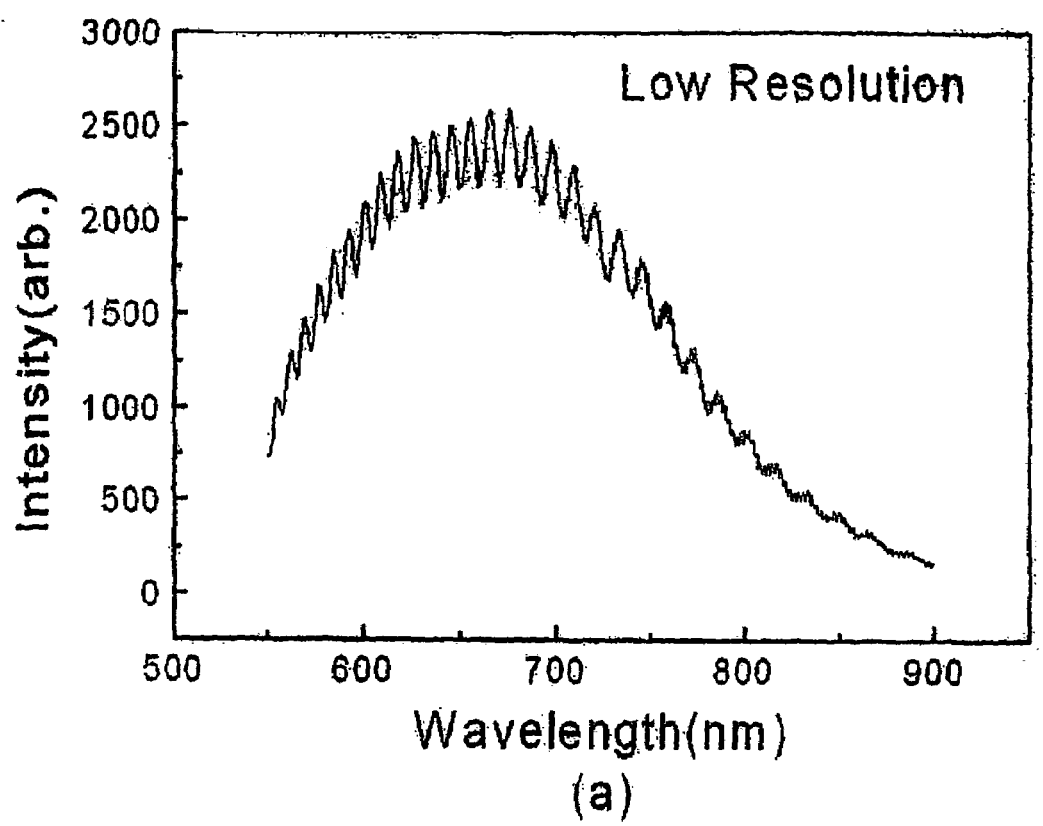
FIGS. 8A and 8B are graphs illustrating a comparison of a reflection spectrum based on a wavelength resolution.
Figure 8B:
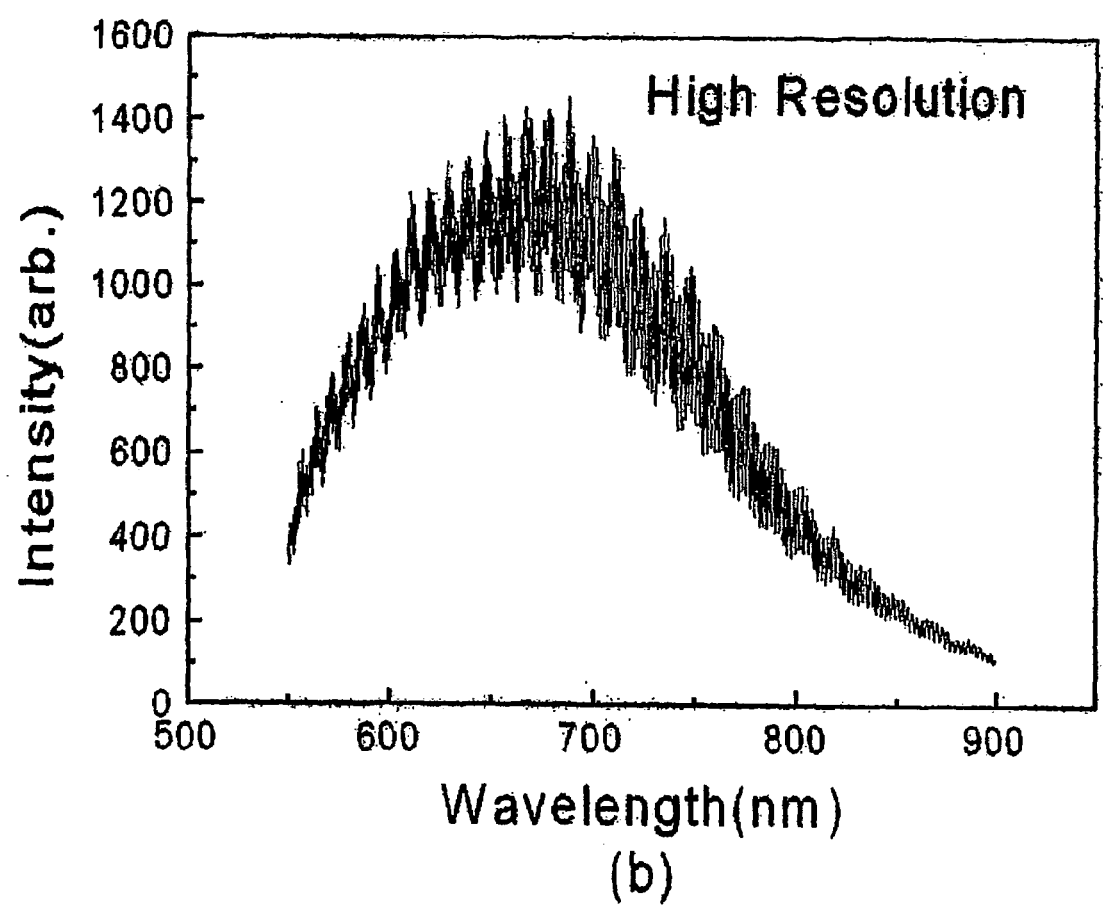

As shown in FIGS. 8 and 9, the effects of the film thickness measuring apparatus and method using a fast Fourier transformation according to the present invention will be described with reference to the results obtained by adapting to the HD-DVD which is an actual sample material. FIG. 8A is a graph of a reflection spectrum of a HD-DVD sample material in the case that the wavelength resolution is small. FIG. 8b is a graph of a reflection spectrum of a HD-DVD sample material in the case that the wavelength resolution is large.

Namely, there is provides a typical reflection spectrum which is a HD-DVD sample material in which a cover layer and a spacer layer are provided on a PC substrate, and a dual recording layer structure is provided on a L/G protrusion structure. It is possible to observe a fast vibration by a thick cover layer in a reflection spectrum in the case that the wavelength resolution is larger compared to the case that the wavelength resolution is small. In addition, it is possible to further check the wavelength resolution dependency of the reflection spectrum.

Figure 9A:
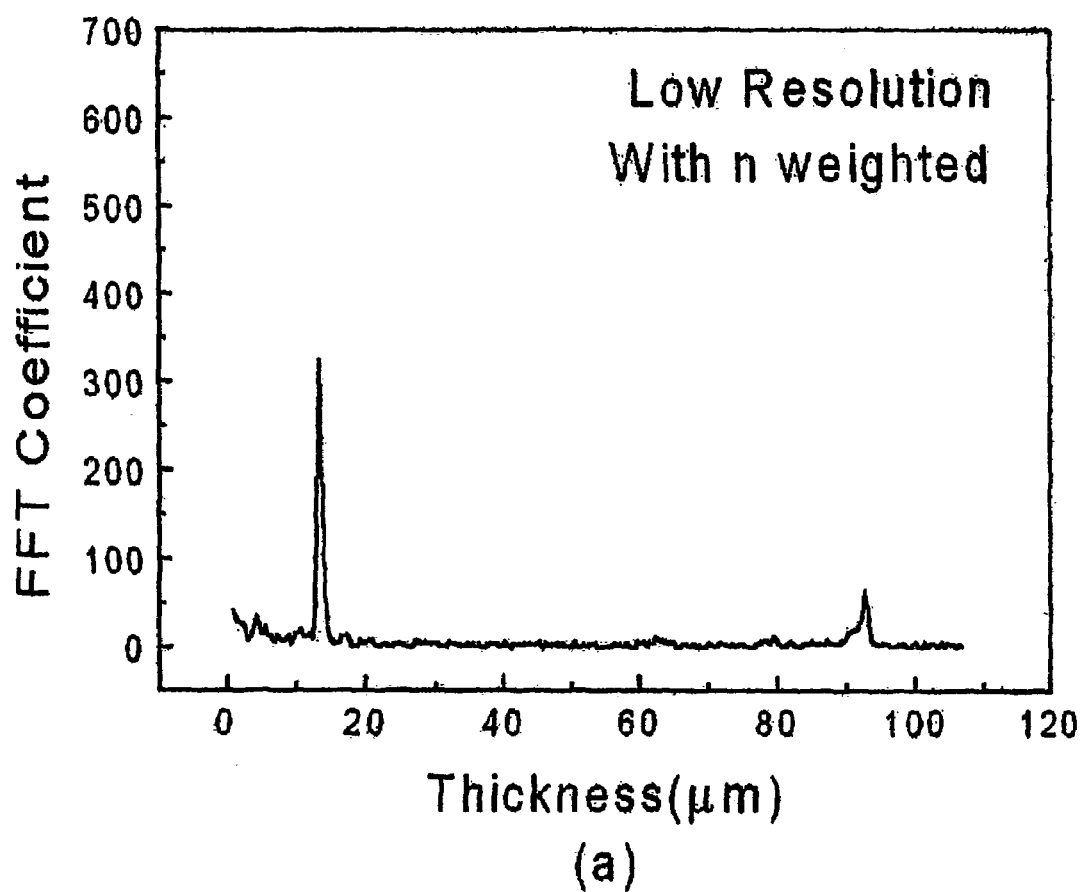
FIG. 9A is a graph illustrating a result of a Fourier transformation of a reflection spectrum having a lower wavelength resolution.

FIG. 9A is a graph of the Fourier transformation of the reflection spectrum having a lower wavelength resolution. The peak corresponding to the thick cover layer is very weak, and the peak based on a thin spacer layer is clear like the result of FIG. 8A.

Figure 9B:
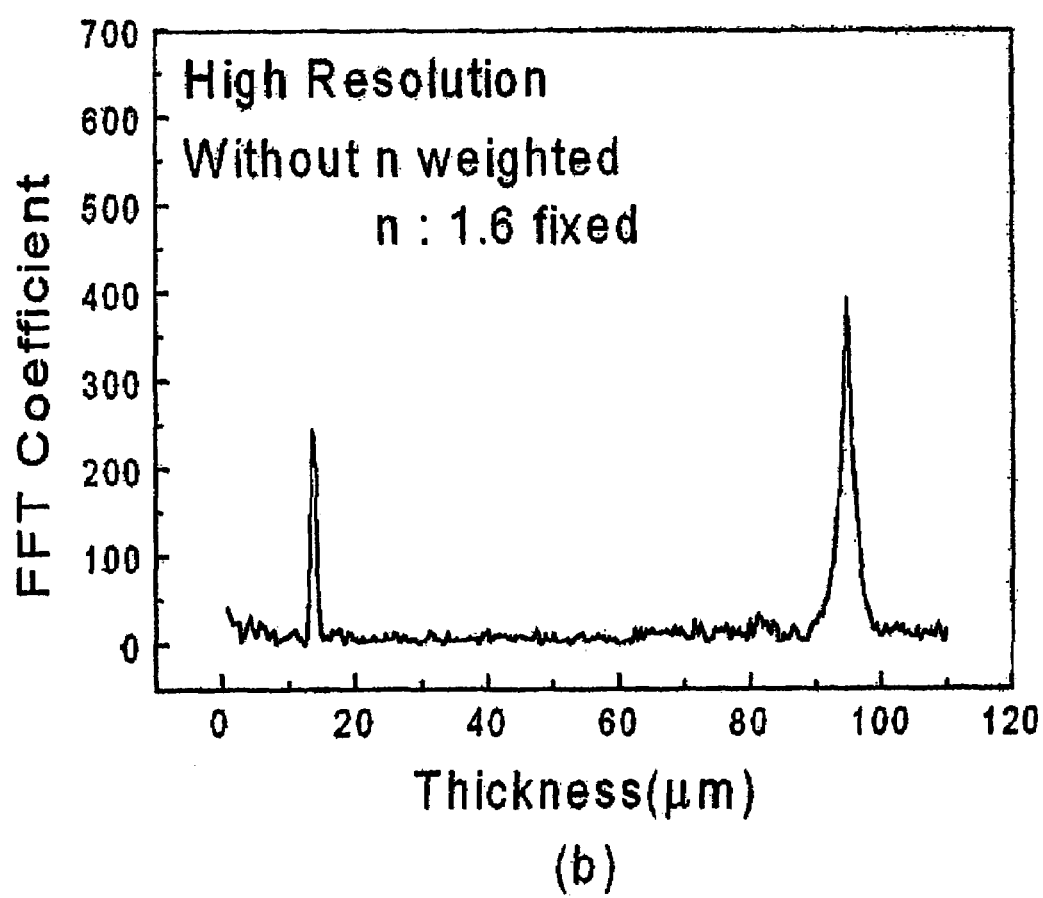
FIG. 9B is a graph illustrating a result of a fast Fourier transformation of a reflection spectrum which has a higher wavelength resolution and is implemented without adapting a reflectivity dispersion.

FIG. 9B is a graph of the fast Fourier transformation of the reflection spectrum which is implemented without considering the refraction index dispersion. In addition, FIG. 9C is a graph of the fast Fourier transformation of the reflection spectrum in which the wavelength resolution is high, and the refraction index dispersion is adapted.

Figure 9C:
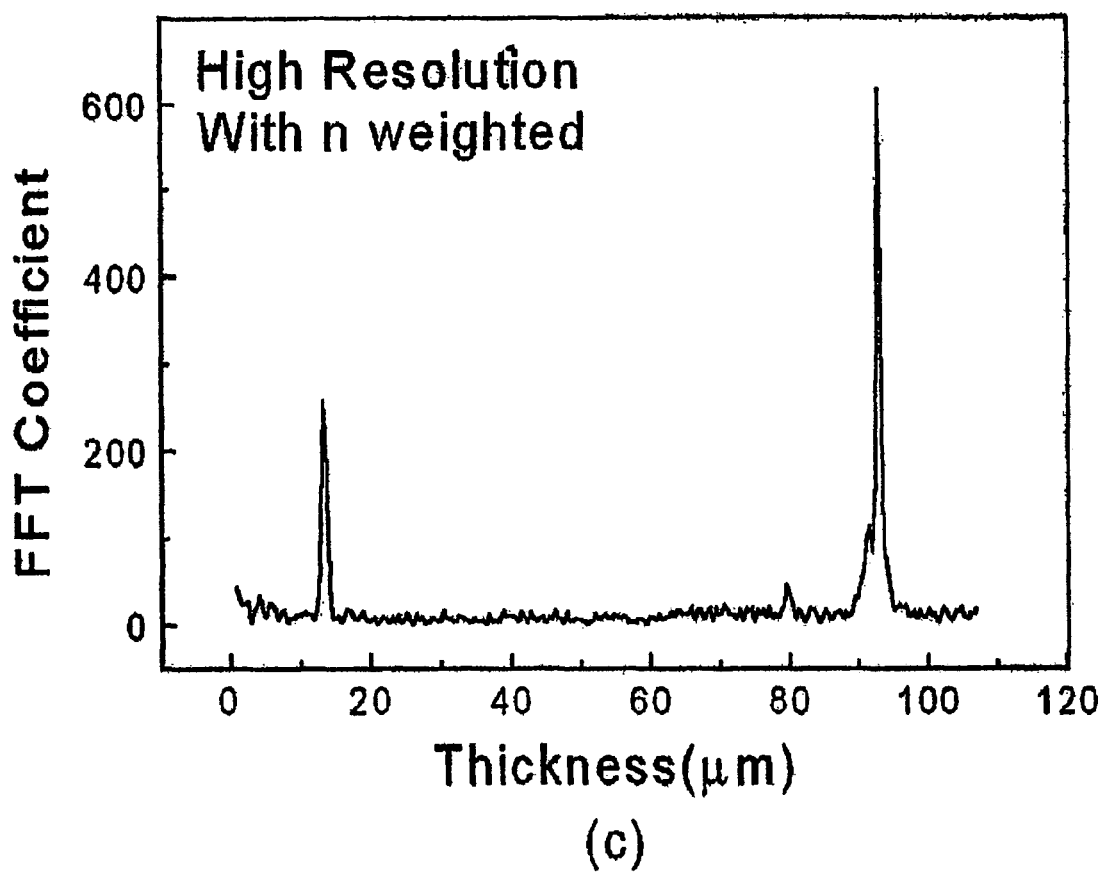
FIG. 9C is a graph illustrating a result of a fast Fourier transformation of a reflection spectrum which has a higher wavelength resolution and is implemented based on a refraction index dispersion.

It is possible to observe the peaks by the spacer layer and cover layer in FIGS. 9B and 9C which are obtained based on the result of FIG. 8B which illustrates the reflectivity spectrum in the case that the wavelength resolution is high. Since the refraction index of the cover layer does not have a big difference with respect tot the spacer layer when comparing with the air, it is possible to observe a larger peak corresponding to the sum of the thickness of the spacer layer and the cover layer compared to the peaks by only the cover layer.

The results obtained by analyzing the reflection spectrum of FIG. 8B based on the refraction index dispersion and not based on the refraction index dispersion will be described.

In the case that the refraction index dispersion is not adapted, the peak corresponding to the summed thickness is 1.77 μm with respect to 94.89 μm and the size of the peak is 392. In the case that the refraction index dispersion is adapted, as shown in FIG. 9C, the width of the peak is 0.63 μm, and the size of the peak is 614, and the thickness is 92.81 μm.

As shown in FIG. 9B, the peak corresponding to the cover layer which is not easily observed is weak, and the value obtained by summing 13.43 μm which is the thickness of the spacer layer is coincided with the summed thickness. The summed thickness value that the refraction index dispersion is not adapted is largely 2.08 μm. Namely, the above result is obtained based on the input of the fixed refraction index as known based on a result of the simulation of the reflectivity spectrum by the dielectric thin film of 30 μm and the analysis.

In the present invention, it is possible to enhance production yield by enhancing reliability in such a manner that the fast analyzing speed is maintained, and the film thickness is measured in high accuracy when measuring the film thickness based on a vibration period by performing the fast Fourier transformation on the energy axis of the light with respect to the reflectivity spectrum in which the refraction index dispersion of the thin film is adapted by providing a refraction index weight.

In addition, even when a reflection film is formed on the substrate at a certain area ratio irrespective of the kinds and structure of the thin film, or in the case that a multiple thin film is formed on the substrate, it is possible to implement a fast measurement of the film thickness based on a high accuracy and fast analyzing speed. The present invention may be further adapted to other spectrums which have a vibration by an interference of a thick thin film such as a transmissivity spectrum, so that the present invention may fully satisfy the demands in the industry which needs a real time measurement and accurate analysis in such a manner that a fast analyzing speed and a high accuracy film thickness measurement and analysis. Therefore, it is possible to enhance a market competitive power.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A film thickness measuring apparatus using a fast Fourier transformation comprising:
    a light source for projecting a light on the surface of a thin film sample;
    a spectrograph for splitting the light reflected from the sample according to each wavelength;
    an optical measuring device array for measuring intensities of each wavelength of the split reflected light;
    a transformation unit for converting a signal of the measured intensities of each wavelength of the split reflected light into a digital signal data; and
    a computation unit for computing a thickness of the thin film based on the number of oscillations obtained by a fast Fourier transformation in which the digital signal data converted by the transformation unit is based on a refraction index dispersion.

2. The apparatus according to claim 1, wherein the computation unit includes means to compute the thickness of the thin film based on the following Equation:

$$d = \frac{619.9}{\Delta(n_f E)} = 619.9 \times f_{nE}$$

where $n_f$ represents a refraction index of the thin film, d represents the thickness of the thin film, $\Delta(n_f E)$ represents a period of reflection spectrum in the axis of photon energy multiplied by the refraction index dispersion, and $f_{nE}$ represents the number of oscillations of a reflection spectrum in the axis of photon energy multiplied by the refraction index dispersion.

3. A method for measurement of film thickness using a fast Fourier transformation comprising the steps of:
    projecting a light on the surface of a thin film sample;
    splitting the light reflected from the sample according to each wavelength;

measuring intensities of each wavelength of the split reflected light;

converting a signal of the measured intensities of each wavelength of the split reflected light into digital signal data; and computing a thickness of the thin film based on the number of oscillations of a reflection spectrum obtained by a fast Fourier transformation in which the digital signal data transformed by a transformation unit is based on a refraction index dispersion.

4. The method according to claim 3, wherein in the step of computing the thickness of the thin film, the film thickness is computed based on the following equations:

$$d = \frac{619.9}{\Delta(n_f E)} = 619.9 \times f_{nE}$$

where $n_f$ represents a refraction index of the thin film, d represents the thickness of the thin film, $\Delta(n_f E)$ represents a period of a reflection spectrum in the axis of photon energy multiplied by the refraction index dispersion, and $f_{nE}$ represents the number of oscillations of a reflection spectrum in the axis of photon energy multiplied by the refraction index dispersion.

* * * * *